Dec. 12, 1944.  J. E. HARVEY ET AL  2,364,788
SLIDE CHANGING DEVICE
Filed Sept. 1, 1942
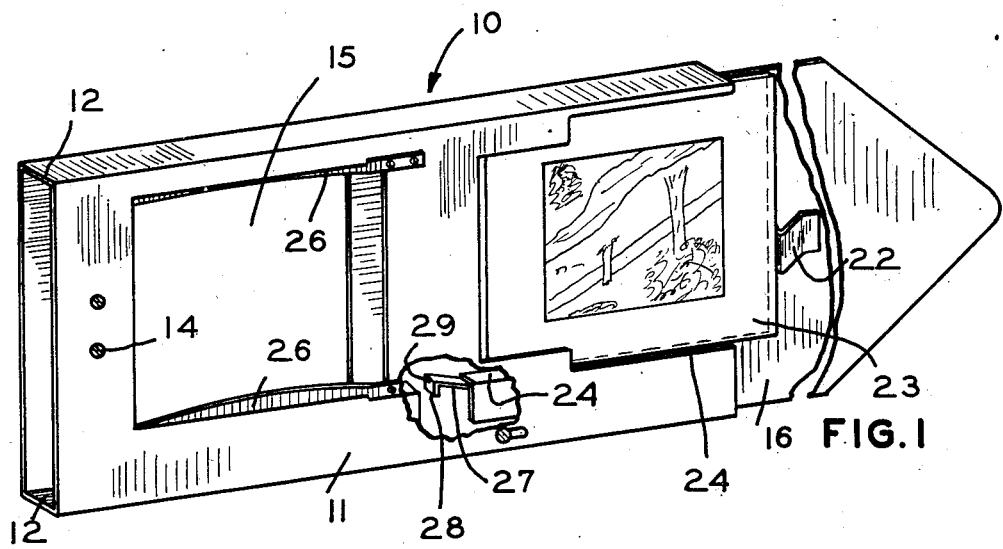
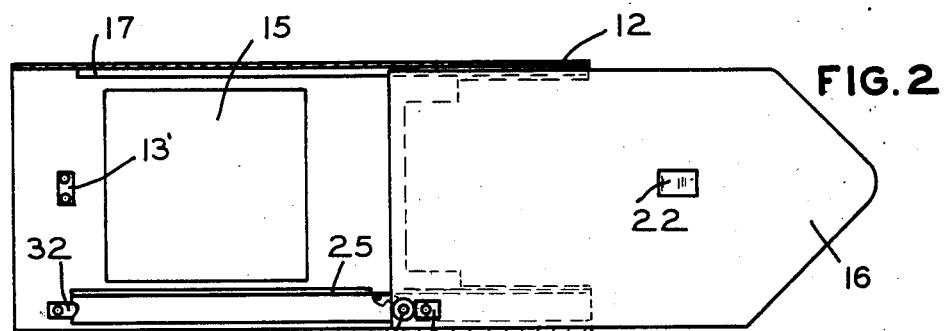
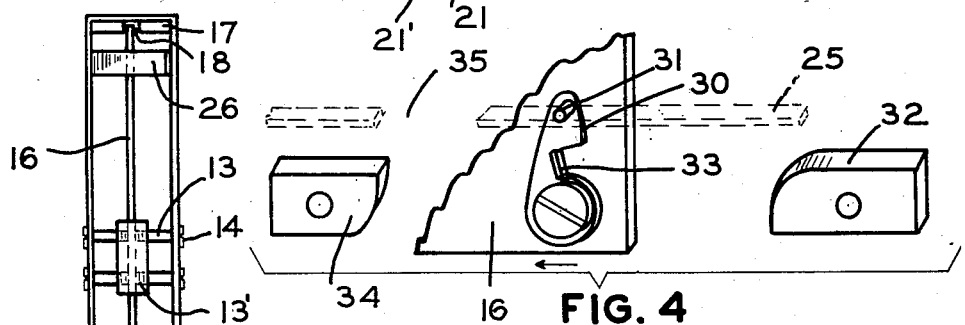
JAMES E. HARVEY
WILLARD T. PERKINS
INVENTOR
BY
ATTORNEYS Patented Dec. 12, 1944

2,364,788

UNITED STATES PATENT OFFICE 2,364,788

SLIDE CHANGING DEVICE

James E. Harvey, Rochester, and Willard T. Perkins, Irondequoit, N. Y., assignors to Bausch & Lomb Optical Company, Rochester, N. Y., a corporation of New York Application September 1, 1942, Serial No. 456,880

4 Claims. (Cl. 88—28)

The present invention relates to projectors, and more particularly, to a slide-changing device by which projection slides are moved into and out of projection position.

One object of the invention is the provision of a simple and easily operated mechanism for changing the slides.

Another object of the invention is the provision in a device of this kind of a slide-shifting device which will move one slide out of projection position and then move another slide into such position.

A further object of the invention is the provision in a device of this kind of a slide-shifting device which will move a slide to a pre-projection position and then on return movement, eject a slide in projection position.

A still further object of the invention is the provision in a slide-changing device of an arrangement by which the slide in pre-projection position is retained in that position until the slide in projection position has been ejected.

A yet further object of the invention is the provision of an arrangement for positively moving the ejecting mechanism out of the slide-engaging position as a slide is being moved to pre-projection position and positively moving said ejecting mechanism into slide-engaging position as the slide is moved into pre-projection position.

A still further object of the invention is the provision in a slide-changing device of an arrangement by which slides of varying thicknesses may be easily moved into and out of projection position.

Other objects and advantages will appear from the following description taken in connection with the accompanying drawing in which:

Fig. 1 is a perspective view of the device of the present invention with a portion thereof broken away to illustrate a detail thereof.

Fig. 2 is an elevational view of the device of the present invention with a wall of the frame of the same removed.

Fig. 3 is an end view of the device of the present invention.

Fig. 4 is a fragmentary view showing details of the cam construction employed.

The device of the present invention, referring now to the drawing and more particularly to Fig. 1, comprises a frame 10 having a pair of side walls 11, spaced apart by top and bottom walls 12. The walls of the frame are held against movement by suitable lugs 13 secured between the side walls 11 by screws or similar fastening means 14.

The side walls 11 are formed with aligned apertures 15 defining a projection aperture. A carrier 16 for moving slides into and out of registry with said projection aperture, is mounted for reciprocal movement on the frame 10. To this end the top wall of the frame carries a pair of plates 17 defining a slot 18 for receiving the upper edge of the carrier 16 while a pair of flanged plates 19 and 20, carried by adjacent faces of the side walls 11 form a guide for the lower edge of the carrier 16.

The carrier is formed with a projecting end to facilitate manipulation of the same for the end may be conveniently grasped by a user and forms a handle by which the carrier may be moved on the frame.

The carrier is movable between alternate positions on the frame, one of said positions being shown in Figures 1 and 2, the other of said positions being one in which a portion of the carrier 16 is in registry with the aligned apertures 15. To prevent overthrow of the carrier when moved to the latter position the lugs 13 should be placed so that they may carry a stop 13' to limit movement of the carrier. A stop 21 adjustably mounted on a wall 11 by means of a pin and slot connection as shown in Fig. 1 engages a lug 21' secured to the carrier 16 and limits movement of the same in the opposite direction.

The carrier in the present invention is used to move the slide into and out of projection position and to this end an abutment 22, formed by a small strip of metal having a reversed bend therein and secured to one face of the carrier, engages the edge of a slide 23 in the storage position as shown in Fig. 1 and moves the same along a track 24 formed by the flange of the plate 19 and into registry with the apertures 15 upon movement of the carrier 16 to the limit of movement as defined by the stop 13'. The slide 23 may be manually placed by the user in the storage position on the carrier 16 as shown by Fig. 1 or it may be fed to this position by any suitable hopper or magazine mechanism having a feeding means associated therewith.

The slide 23 while supported by the track 24 is not in projection position but in a pre-projection position and is automatically moved onto a track 25 formed by the flange of plate 20 and into projection position by a pair of bowed-leaf springs 26, upon return of the carrier 16 to its position as shown in Figs. 1 and 2.

The one end of each spring 26 is secured at the top and bottom edges respectively of the aperture in one of the side walls 11, the bow of each extending across the frame, while the free end of each spring is disposed within the frame at the opposite side of the projection aperture. The springs do not interfere with movement of the slide as it is moved to pre-projection position for the forward edge of the same during this movement of the carrier engages the bows of the springs and urges the same back out of the way. The bows of the springs act against the top and bottom edges of the slide and as soon as the same is moved to the pre-projection position and the preceding slide has been injected, urge the slide across the frame to the projection position.

To facilitate movement of the slide from track 24 to track 25 the latter track may be formed, as best shown in Fig. 3, slightly below the former. This construction also obviates the danger of a frayed binding tape catching at the edge of the track 25 as the slide is moved onto the same.

Means are provided in the present invention to prevent a slide in pre-projection position from returning with the carrier as the latter is moved back to the position shown in Fig. 1. The means in the form now preferred comprises a spring arm 27 having one end secured to the underneath surface of the track 24 and obliquely projecting through a slot 28 formed in the track to a point above the same, with the other end reversely bent downward to form a stop 29 facing the slide in pre-projection position. The slot 28 formed in the track 24 takes the downwardly projecting end of the arm as the leading edge of the slide engages and cams the upwardly projecting portion of the arm 27 to a position flush with the surface of the track 24 as the slide is moved along the same. As the arm is resilient it will spring back after the passage of the slide and move the stop 29 formed by the reverse bend at the free end thereof into operation position.

After a slide has been projected, it may be removed from the frame by means separate from the carrier but in the preferred embodiment of the invention the slide ejecting means are carried by and made operative through movement of the carrier 16. The ejecting means in the form of the invention now preferred comprises an arm 30 pivotly mounted on the lower edge of the carrier and provided with a rigidly mounted finger 31 projecting from the exposed face thereof. The arm 30 is designed to move under the track 25 during movement of the carrier 16 from storage position to the other position on the frame defined by the stop 13' but to move over the track on return movement of the carrier to permit the finger 31 to engage the edge of a slide in projection position and move the same along the track 25 to an ejected position from which it is taken by the operator or from which it may be fed to a suitable magazine.

Any means desired may be used to bring about the desired movement of the arm, but in the embodiment of the present invention now preferred, referring to Fig. 4, the arm is positively moved by a cam 32, adjustably mounted by means of a pin and slot connection (not shown) to the inner surface of a side wall 11 of the frame 10. The cam is mounted at one side of the projecting aperture so as to be disposed in the path of movement of a small plate 33, partially lanced from the arm 30. Upon movement of the carrier 16 to its position on the frame as defined by stop 13' the plate 33 is moved into engagement with the cam 32 and the arm 30 is rocked or cammed about its pivot to the position overlying the track as shown in Fig. 4. With the arm in this position, return movement of the carrier will cause the finger 31 to engage the side edge of a slide in projection position and draw the same along the track 25 to the ejected position.

To move the arm 30 around the end of the track 25 to the position underlying the same so that the carrier 16 may be moved to the other of its alternate positions, a cam 34 carried at the opposite side of the projection aperture, rocks the arm 30 through a slot 35 formed in the track 25 as the opposite face of the plate 33 is moved into engagement with the cam 34. With the arm 30 now underlying the track 25, the carrier 16 may be moved to the other of its alternate positions without interference between the arm 30 and a slide in projection position.

Although the movements of the slides into and out of projection position have been separately described, it will be seen that actually these movements of the slides are substantially simultaneously made for as a slide is moved into pre-projection position the ejecting mechanism is conditioned for ejecting the slide in projection position and upon return movement of the carrier 16 the slide in projection position is moved therefrom as the slide in pre-projection position is moved into projection position.

The shifting mechanism of the present invention is simple, easy to operate, and due to the particular mechanism employed, slides of various thicknesses may be used without difficulty, for sufficient tolerance is provided for slides of even substantially twice the thickness of conventional slides.

Furthermore, in many of the heretofore proposed slide changing devices, slides of which the holding tape through wear had become frayed would often jam and render the device inoperative. As the mechanism of the device of the present invention is positive but yet simple and rugged, there is a little danger of the device getting out of proper working order even though badly frayed slides are handled thereby.

Wear of the stops for limiting movement of the carrier may be easily compensated for by merely adjusting either the stop 21 or the cam 32 or both if need be so that the device is quite easily maintained in proper adjustment.

While one embodiment of the invention has been disclosed, it is understood that the invention need not be limited to the device as described, but is susceptible of modifications falling within the spirit of the invention and the scope of the appended claims.

We claim:

1. A slide changing device comprising a frame having top and bottom walls and a pair of spaced side walls with aligned apertures therein defining a projection position; a pair of slide-carrying tracks extending longitudinally of said frame adjacent the lower wall thereof; a guide intermediate said tracks; a guide adjacent the top wall of said frame and aligned and co-extensive with said lower guide; a slide carrier extending between said guides and mounted for reciprocal movement along the same between alternate positions on said frame; an arm having one end pivotally mounted on one side of said carrier; a finger laterally projecting from the free end of said arm; cam means engaged by said arm upon movement of said carrier to one of said alternate positions and moving said arm to a position in which said finger overlies one of said tracks whereby movement of said carrier toward the other of said alternate positions causes the finger to engage and move a slide in projection position along said track to an ejected position; additional cam means for engaging and moving said arm to position the finger carried thereby underneath said track upon movement of said carrier to the other of said positions; rigid means on the opposite side of said carrier overlying the other of said tracks for engaging a slide in storage position and moving it into a pre-projection position in registry with said apertures upon movement of said carrier to the other of said positions, said carrier in the last-named position being disposed between the slide in pre-projection position and a slide in projection position; means for holding the slide in the pre-projection position in registry with said apertures upon return movement of said carrier; and a leaf spring having an end fixed to one of said side walls and bowed toward the other for moving said last-named slide into projection position upon ejection of the first-named slide by said finger as said carrier is moved out of the position between said slides.

2. A slide changing device comprising a frame having top and bottom walls and a pair of spaced side walls with aligned apertures therein defining a projection position; a pair of slide-carrying tracks extending longitudinally of said frame adjacent the lower wall thereof; a guide intermediate said tracks; a guide adjacent the top wall of said frame and aligned and co-extensive with said lower guide; a slide carrier extending between said guides and mounted for reciprocal movement along the same between alternate positions on said frame; an arm having one end pivotally mounted on one side of said carrier; a finger laterally projecting from the free end of said arm; cam means engaging said arm upon movement of said carrier to one of said alternate positions and moving said arm to a position in which said finger overlies one of said tracks whereby movement of said carrier toward the other of said alternate positions causes the overlying end of said arm to engage and move a slide in projection position along said track to an ejected position, said track having an opening formed therein; additional cam means for engaging and moving the said arm through said opening upon movement of said carrier to the other of said positions to dispose the finger carried by said arm underneath said track; rigid means on the opposite side of said carrier overlying the other of said tracks for engaging a slide in storage position and moving it into a pre-projection position in registry with said apertures upon movement of said carrier to the other of said positions, said carrier in the last-named position being disposed between the slide in pre-projection position and the slide in projection position; means for holding the slide in the pre-projection position in registry with said apertures upon return movement of said carrier; and a leaf spring having an end fixed to one of said side walls and bowed toward the other for moving said last-named slide into projection position upon ejection of the first-named slide by the end of said arm as said carrier is moved out of the position between said slides.

3. A slide changing device comprising a frame having a top and bottom wall with a pair of spaced side walls formed with aligned apertures therein; a pair of slide-carrying tracks extending longitudinally of said frame adjacent the lower wall thereof; a guide intermediate said tracks; a guide formed adjacent the top wall of said frame and co-extensive with said first-named guide; a slide carrier comprising a rigid plate having the top and bottom edges thereof mounted for reciprocal movement along said guides between alternate positions on said frame; means on one side of said carrier adapted upon movement of the same from one of said alternate positions to engage and move a slide in a storage position along one of said tracks to a pre-projection position in which said carrier is in the other of said alternate positions and disposed between the slide in said pre-projection position and the projection position; means for moving said slide in the pre-projection position to projection position upon movement of the carrier in the opposite direction whereupon a second slide may be moved from the storage position to the pre-projection position; an arm having one end pivotally mounted on the opposite side of said carrier; a finger laterally projecting from the free end of said arm; means for engaging and moving said arm into a position in which the finger thereof engages the slide in projection position and moves the same along the other of said tracks upon movement of said carrier in the opposite direction to an ejected position; and means adapted upon movement of said carrier to the ejected position to move said arm to a position in which the finger carried thereby underlies said track and will not interfere with movement of said carrier to move a slide to the pre-projected position.

4. A slide changing device comprising a frame having top and bottom walls and a pair of spaced side walls with aligned apertures therein defining a projection position on said frame; a pair of horizontally displaced slide-carrying tracks extending longitudinally of said frame adjacent the lower wall thereof, one of said tracks being displaced downwardly from the other; a guide intermediate said tracks; a guide adjacent the top wall of said frame and aligned and co-extensive with said lower guide; a slide carrier extending between said guides and mounted for reciprocal movement along the same between said projection position and a storage position on said frame; an arm having one end pivotally mounted on one side of said carrier; a finger laterally projecting from the free end of said arm; cam means carried by said frame adjacent said apertures and engaged by said arm upon movement of said carrier to said projection position for moving said arm to a position in which said finger overlies the downwardly displaced track whereby movement of said carrier toward said storage position causes the finger to engage and move a slide in projection position along said track to an ejected position; cam means carried by said frame adjacent the storage position of said carrier for engaging and moving said arm to position the finger carried thereby underneath said downwardly displaced track upon movement of said carrier to said storage position; rigid means fixed to said carrier and overlying the other of said tracks for engaging a slide in storage position on said track and moving it into a pre-projection position in registry with said apertures upon movement of said carrier to projecting position, said carrier in the last-named position holding the slide in pre-projection position out of the projection position; means for holding the slide in the pre-projection position upon return movement of said carrier; and a leaf spring having an end fixed to one of said side walls and bowed toward the other for moving said last-named slide into projection position upon ejection of the first-named slide by said finger as said carrier is moved out of the projection position.

JAMES E. HARVEY.
WILLARD T. PERKINS.